(12) United States Patent
Seesing

(10) Patent No.: US 6,958,008 B2
(45) Date of Patent: Oct. 25, 2005

(54) DEVICE FOR SKINNING POULTRY PARTS

(75) Inventor: William Seesing, Kapellen (BE)

(73) Assignee: FPM International, Kalmthout (BE)

( * ) Notice: Subject to any disclaimer, the term of this patent is extended or adjusted under 35 U.S.C. 154(b) by 5 days.

(21) Appl. No.: 10/474,344

(22) PCT Filed: Apr. 9, 2001

(86) PCT No.: PCT/BE01/00061
§ 371 (c)(1),
(2), (4) Date: Apr. 5, 2004

(87) PCT Pub. No.: WO02/080688
PCT Pub. Date: Oct. 17, 2002

(65) Prior Publication Data
US 2004/0171341 A1 Sep. 2, 2004

(51) Int. Cl.[7] .............................................. A22C 21/00
(52) U.S. Cl. ....................................................... 452/84
(58) Field of Search .......................... 452/125, 127–130; 99/584, 589

(56) References Cited

U.S. PATENT DOCUMENTS

| 2,477,289 | A | * | 7/1949 | De Moss ..................... 452/130 |
| 2,630,599 | A | * | 3/1953 | Grant et al. ................ 452/123 |
| 3,729,775 | A |   | 5/1973 | McDonald |
| 4,998,323 | A |   | 3/1991 | Martin et al. |
| 5,236,323 | A | * | 8/1993 | Long et al. ................. 452/127 |
| 5,399,118 | A | * | 3/1995 | Long et al. ................. 452/127 |
| 5,503,593 | A | * | 4/1996 | Schill ......................... 452/127 |
| 5,637,038 | A | * | 6/1997 | Davis .......................... 452/130 |
| 5,766,066 | A | * | 6/1998 | Ranniger .................... 452/127 |

FOREIGN PATENT DOCUMENTS

| DE | 24 20 188 | 11/1975 |
| NL | 8 302 207 | 1/1985 |

* cited by examiner

Primary Examiner—Thomas Price
(74) Attorney, Agent, or Firm—DLA Piper Rudnick Gray Cary US LLP

(57) ABSTRACT

This invention relates to a device for removing the skin (6) from opposite sides of bird trunk (3), the device comprising a conveyor (4) for moving at least one bird trunk from a loading position (5) towards a skinning device, the skinning device comprising a first skinner (10) for removing the skin from a first side (1) of the bird trunk (3) and a second skinner (20) for removing the skin from a second side (2) of the bird trunk (3) opposite the first side, the conveyor (4) being provided for moving the trunk part (3) from the loading position (5) in downward direction towards the first skinner (10), the device comprising a first guiding (11) with a pair of guidings positioned on opposite sides of the conveyor (4) for positioning and guiding the trunk part in longitudinal direction with its head front end (7) pointing towards a central passage (30) in the device and the first skinner (10), the device comprising a second guiding (21) at a position below the first guiding (11) for guiding the trunk part towards the first skinner and restricting the movement of the trunk part in a direction pointing away from the first skinner (10).

10 Claims, 2 Drawing Sheets

DEVICE FOR SKINNING POULTRY PARTS

CROSS REFERENCE TO RELATED APPLICATIONS

This application is the U.S. National Stage of International Application No. PCTJBE01/00061 filed Apr. 9, 2001.

BACKGROUND OF THE INVENTION

1. Field of the Invention

This invention relates to a device for skinning the breast and back of a poultry part.

2. Description of the Prior Art

In U.S. Pat. No. 4,338,704 a device for skinning beef tongues is disclosed in which a tongue to be skinned is placed on an infeed support surface, the longitudinal axis of the tongue extending parallel to the transport direction. The tongue is manually moved towards a blade with a cutting edge. The lower side of the blade faces a toothed, rotating gripping roller. A leading portion of the skin is biased into engagement with the teeth of the gripping roller and pulled into the blade. The tongue is pulled forward into the blade by the roller and the skin is sled from the side of the tongue facing the blade. To remove the skin from the other surfaces of the tongue, the tongue is re-oriented after each pass through the machine, to expose another surface to the skinning blade.

In U.S. Pat. No. 4,998,323 a device is disclosed for skinning poultry parts to which the wings have been left, but the head, neck, legs and thighs have been removed. The device comprises a pair of parallel conveying chains for conveying the poultry parts towards a skinner unit. Outwardly from the path of the chain, each chain is provided with pairs of closely spaced vertically extending tabs, for receiving and suspending the wings of a poultry part there between. In operation, a poultry part supported by a support plate is simultaneously suspended to the tabs by positioning each wing between a pair of tabs, the body oriented neck up, back downstream. As the poultry body enters the device the tendons are cut and the wings are confined above by retaining rails, which prevent the wings from escaping. As the poultry body is advanced into the machine, its bottom contacts an auger whose conveying speed exceeds that of the chains. This moves the bottom of the bird body ahead of the wings and brings the body with the backs down to the back skinner. The backs are carried over a first toothed skinning roller, the teeth of which engage and remove the skin form the backs. A shear plate prevents the meat from continuing with the skin. The upper halve of the bird then clears the shear plate, swings downward and rearward while being suspended only by its wings and takes a back down orientation. The poultry body arrives in front of a second skinner in the back down orientation and passes over the second skinner to have the skin removed from the back. The operation of the second skinner is similar to the first. After having been skinned, the poultry body is engaged by a cone shape fixture that enters into the body cavity and supports the breasts to leave the device.

In the device of U.S. Pat. No. 4,998,323 the conveying chains are driven in an intermittent motion of regularly repeating cycles of a predetermined stroke length. Besides this, the operation of the device is quite complicated and puts a stiff demand on the positioning of the bird bodies by the device. After being supplied in a first orientation to allow skinning of the breast part, the birds become suspended to their wings to allow inverting their orientation to skin the back part. There is thus a need to a device with a simplified functioning.

SUMMARY OF THE INVENTION

It is an object of this invention to provide a device and a method with which opposite sides, in particular the back and breast side, of a bird part may be skinned in an automatic manner, in one single operation.

This is achieved in the present invention with the characterising features of the first claim.

The conveyor is provided for moving the at least one trunk part from the loading position in downward direction towards the first skinner, the first skinner being located at a lower level as compared to the loading position. Because of this arrangement, the length of the conveyor belt may be limited as use can be made of the weight of the trunk part for at least part of its movement throughout the skinning device.

On opposite sides of the conveyor a pair of guiding means are mounted, which together form a first resistance controlling the movement of the trunk part towards a central passage of the device and towards the first skinner located on a first side of the central passage. The trunk parts are provided to be loaded to the conveyor with their longitudinal direction extending in the moving direction of the conveyor, towards the first skinner, the head front end of the trunk part pointing in the direction of the central inner space of the device. As the trunk narrows towards the head front of the trunk and the skin at the head front is often already partly loosened from the meat, the trunk arrives at the first skinner in a way in which an optimum grasping of the skin is made possible.

The device comprises a second guiding on a side in the central space slightly above, and preferably opposite the first skinner so as to restricting the movement of the trunk part in a direction pointing away from the first skinner. As a first skinner, preferably use is made of a toothed roller, which is rotated in a direction pointing towards the second skinner. The rotation of the skinning roller may have the effect of pushing the trunk part away from the first skinner, leading to an imperfect skinning. The presence of the second guiding not only counteracts this but also counteracts rotation of the trunk part with respect to the skinner involved by the own weight of the trunk part. Rotation of the trunk part would also lead to an imperfect skinning as it may involve the consequence that e.g. only a side part of the trunk contacts the first skinner or that the first, skinned side of the trunk part would contact the second skinner, the second side of the trunk part still being covered by the skin.

The device comprises a second skinner located at a lower level with respect to the first skinner, on a side of the central space opposite the first skinner. The arrangement of the first and second skinner on opposite sides of the central space allows subsequent skinning of the first and second side of the trunk part as it is displaced throughout the device by its own weight, without involving a need to rotate the trunk part in the course of the skinning action.

The distance d between first and second skinner is adjusted to the distance b between the first and second side of the trunk part in such a way that as soon as at least part of the first side of the trunk part has passed the first skinner, the opposite second side of the trunk part contacts the second skinner to be skinned.

It has now been found that with the device of the present invention an improved and extended skinning of the trunk parts may be obtained. According to the state of the art methods, there were always parts of the trunk, which remained un-skinned. Therefore, this part had to be cut away or skinned in a manual manner. As the meat of breast and back is sold as the more expensive poultry or bird meat, this constituted an unwanted loss, which may now be overcome.

On the side of the central space opposite the first skinner, means are provided for biasing the trunk part towards the first skinner, as the rotation of the first skinner roller may have the effect that the trunk part is pushed away from it. Preferred biasing means comprise an endless conveyor belt, which is provided to be revolved in a direction pointing towards the first skinner. This conveyor transports the trunk part back to the first skinner each time it gets pushed away therefrom.

Furthermore, separate recovery of the back skin and the breast skin is provided by providing at a position below respectively the first and second skinner, means for receiving the back and breast skin and conveying the back and breast skin to the appropriate container. This is important as the back and breast skin may be individually processed into poultry food products. Besides this means are provided for recovering the skinned trunk parts separately from the skin.

DETAILED DESCRIPTION OF THE DRAWINGS

Figure 1:
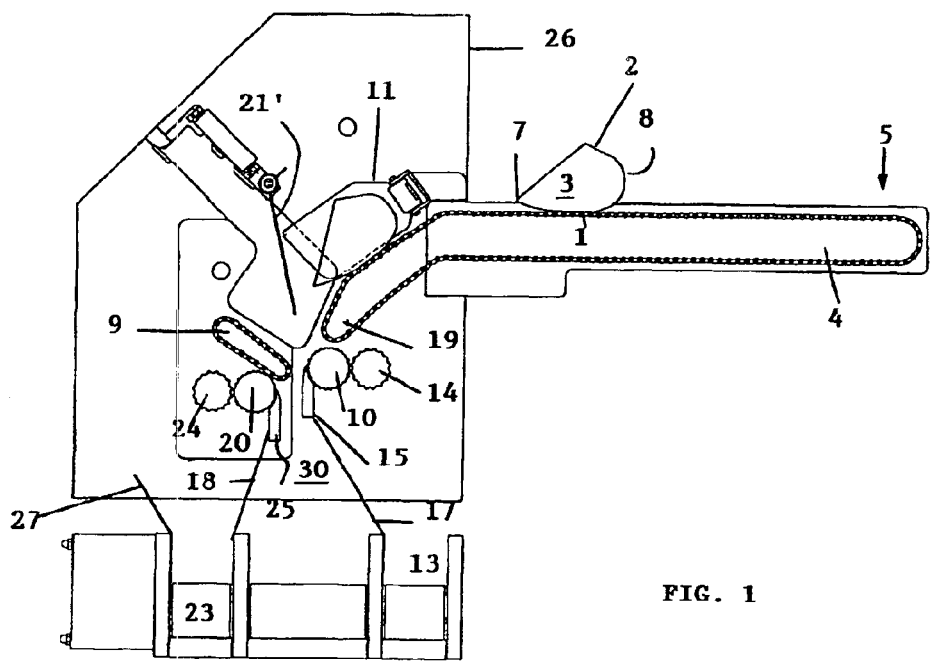
FIG. 1 is a side view to the trunk part skinning device of this invention.
Figure 2:
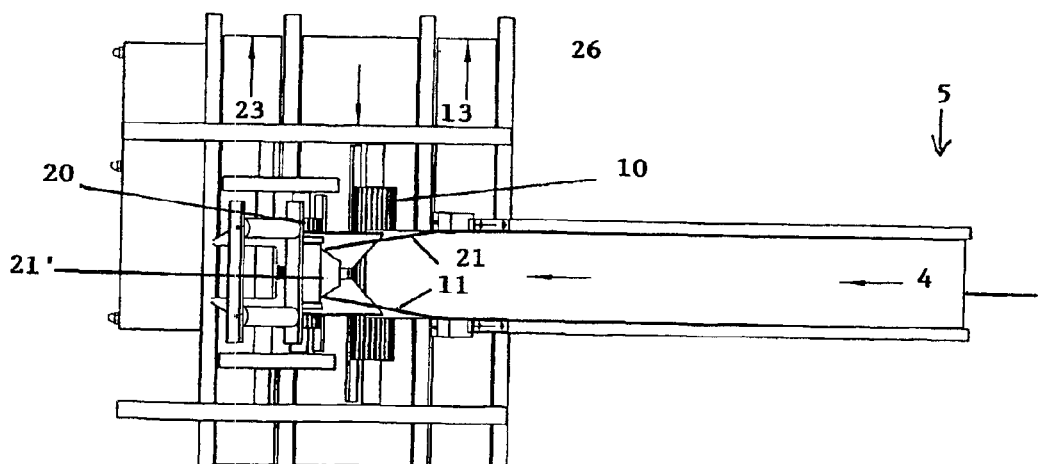
FIG. 2 is a view from the top of the trunk part skinning device of this invention.
Figure 3:
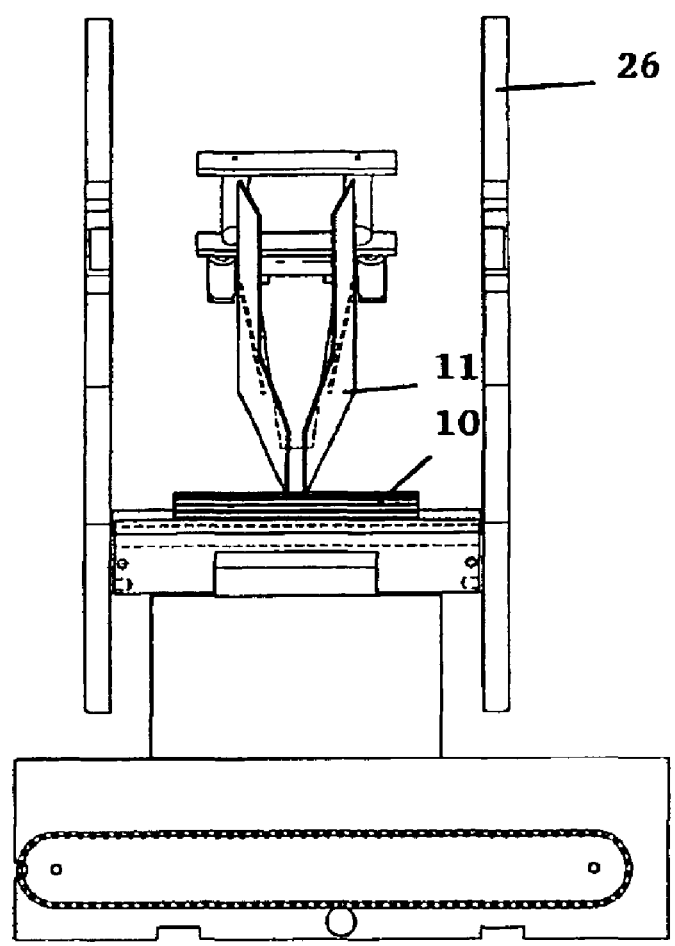
FIG. 3 is a view to the inside of the skinning device of this invention.

As can be seen from FIG. 1, the device of this invention comprises a loading position 5 for loading bird trunk parts 3 to be skinned to a conveyor 4. The device of this invention is suitable for removing the skin from trunk parts of poultry, for example chickens, pheasants, small turkeys etc.

The conveyor 4 comprises an endless conveyor belt, which is revolved around a first and second axis 19. The conveyor 4 is preferably revolved in a continuous movement, to avoid interruption of the skinning operation and improve the skinning operation. The conveyor 4 takes care of transporting the trunk parts 3 that need to be skinned from the loading position 5 towards a first and a second skinner 10, 20 mounted on opposite sides of a central passage 30 in the skinning device. Except for the loading position 5 and a first part of the conveyor 4, the majority of the parts described hereafter are mounted in a housing 26, to limit the access to the interior of the device as much as possible and improve the machine safety. It is in particular desirable to limit the access to the skinning devices 10, 20 as much as possible.

As soon as the conveyor belt 4 enters the housing, it is deflected in downward direction, towards the first skinner 10 to allow delivering the trunk parts 3 in an optimum orientation to the first skinner 10. The first skinner 10 is located at a level below the level of the loading position 5. This is done to facilitate the movement of the trunk parts 3 throughout the machine by making use of their own weight, and to render the use of conveyor belts for transport superfluous. For the same reason, to allow displacement of the trunk part by its own weight from the first to the second skinner, the second skinner 20 is located at a level below the first skinner 10. Besides this, mounting a conveyor belt along the skinner 10, 20 would be rather complicated as the dimensions of the central space 30 are limited and need to be limited to limit the degree of freedom of a passing trunk part.

The first skinner 10 is provided for removing the skin from a first side 1 of the trunk 3, preferably the breast-side. The second skinner 20 is provided for removing the skin from the second side 2 of the trunk 3 opposite the first side, preferably the back-side. This order of skinning is preferred as it allows obtaining an optimum skinning. The first and second skinner 10, 20 each comprise a skinning roller 10, 20 and means 15, 25 co-operating therewith to create a slit for grasping the skin from respectively the breast and back side of the trunk part. The cleaning roller 14, 24 is provided to rotate around a central axis, in a direction pointing towards the central passage 30. This is important as rotation of the first skinning roller towards the central passage 30 involves that the trunk part 3 is forced to move from the first skinner 10 in the direction of the second skinner 20. This also involves that the trunk part 3 after the skinning operation has been completed is forced to move in downward direction towards the meat recovery container 29.

In a position slightly above the second skinner 20, facing the first skinner 10 means 9 are provided for biasing the trunk part towards the first skinner 10. These means 9 may be various devices known to the man skilled in the art, for example a roller rotating in the direction of the first skinner, or preferably a conveyor belt 9 revolving in the direction of the first skinner 10. Namely as the trunk part contacts the first skinner 10, it is entrained therewith and pushed away from it. The conveyor belt 9 is mounted at such a distance from the first skinner 10, that the back part of the trunk contacts the conveyor belt 9 as it is pushed from the first skinner. Rotation of the conveyor belt 9 towards the first skinner 10 forces the trunk part towards the first skinner 10.

To provide an optimal skinning of the trunk parts 3 it is important that the distance between the first and second skinner 10, 20 is adjusted to the size of the trunk parts. Preferably care is taken to mount them at such a distance from each, other that the back skin is grasped by the second skinner 20 when skinning of the breast part has nearly been completed by the first skinner and the breast part is about to leave the first skinner 10. This mounting ensures a virtually complete skinning of the trunk part.

The means 15, 25 for creating a slit for grasping skin may be appropriate means generally known to the man skilled in the art. These means may for example comprise a second roller revolving in opposite direction of and engaging the skinning roller 10, 20 or a stripping blade co-operating with the roller.

Each skinning roller 10, 20 preferably comprise a toothed cylinder with a plurality of substantially equally spaced circumferential reliefs milled in its surface. An optimised skinning may be obtained by orienting the reliefs in a particular direction, or by adjusting the shape, distance and depth of the reliefs. The skinning rollers 10, 20 are kept substantially free of remaining fat or skin with appropriate means known to the man skilled in the art. This may for example be a meshing stripper roller 14, 24, the surface of which has a shape complementary to the shape of the skinning roller 10, 20. The skinning (10, 20) and stripper rollers (14, 24) may be rotated in the same or in opposite directions. Optimum cleaning of the skinning roller may be obtained by having both the skinning and stripper roller rotated in the same direction, their teeth pointing in opposite directions.

To optimise the skinning operation it is important that the trunk parts contact the first and second skinner 10, 20 in the optimal orientation. Orientation of the trunk parts 3 is done by a first and second guiding 11, 21 present in the device. The first guiding 11, comprises a first and second plate mounted on opposite sides of the first conveyor 4 and is preferably connected to the housing 26. The plates are mounted in such a way that they converge to each other in the processing direction of the device, i.e. in the direction of the central passage 30 of the device. Each plate or sheet 11 has a plane which extends in longitudinal direction of the conveyor, along the conveyor 4. The plane of the sheet 11 preferably extends at least partly along the downwardly bent part of the conveyor 4 leading to the first skinner 10. Each plate 11 is hingedly mounted, the hinge axis extending perpendicular with respect to the longitudinal direction of the conveyor 4. The hinged mounting involves that the plates form a resistance for the passing trunk parts, which although it may be small, ensures that the trunks arrive at the skinner 10 in the desired orientation. The displacement of the plates is preferably limited to the width of the conveyor. As the back-side of the trunk parts is quite heavy, they will have a tendency to zig-zag on the conveyor 4. Only when the trunk parts arrive at the first guiding with their head part in front, the trunk parts will be capable of overcoming the resistance exerted by the first guiding 11, of pushing the plates gradually and partly aside and passing through the first guiding 11.

The passing space created by the first guiding 11 gives access to a funnel-like passing space formed by a second guiding 21. As can be seen from FIG. 1, the first guiding 11 preferably extends into the funnel shaped space formed by the second guiding. The second guiding 21 is mounted at a position below the first guiding 11, where the conveyor belt 4 deflects in downward direction. The second guiding 21 preferably extends to the lower end of the conveyor belt 4. The second guiding 21 preferably comprises a set of at least three plates, which together delimit a funnel-shaped space and are also connected to the housing 26. The funnel-shaped space converges from the lower part of the first guiding towards the first skinner. The size of the funnel-like passing space is usually smaller than the dimensions of the trunk part that needs to be skinned. As the plates are hingedly mounted they will be pushed apart by a passing trunk part and return to their initial position as soon as the trunk part has passed. A plate 21' is preferably mounted in such a way that its plane faces the plane of the first conveyor 4. This mounting is preferred as it provides an improved orienting of a trunk part leaving the first guiding 11. A trunk part arriving with its front end through the gate formed by the first guiding 11 will collide with this front end against the plate 21'. The simultaneous downward movement of the trunk part 3, because the conveyor 4 is deflected in downward direction at this position, involves a tendency of the trunk part to rotate around its front end. This may involve an inversion of the trunk part and of the back part contacting the first skinner in stead of the breast part, which might involve a less perfect skinning.

The plates 21 function to control the displacement of the trunk part in downward direction, towards the first skinner 10. The conveyor 9 is positioned such that the trunk parts leaving the second guiding 21 contact the conveyor 9 and are then canted in towards the first skinner 10 in the correct manner, to optimise the skinning operation. In absence of the conveyor 9, optimum contact with the skinner 10 cannot guaranteed and the skinning would be of inferior quality. The plate 21' is provided to prevent rolling over of the trunk part.

The knives 15, 25 are preferably connected to separation walls 17, 18, 27. The first separation wall 17 ensures that the breast skins are collected and conveyed by conveyor belt 13 to a container therefor. The separation walls 18, 27 define a space for receiving the skinned trunk parts and transporting the trunk parts preferably by means of a conveyor 28 to a container for the trunks. Back skins are directed along the opposite side of separation wall 27 towards a conveyor belt 23 and a container therefor. The separated recovery of the breast and back skin is advantageous as both skins are industrially processed, usually in different types of products.

As continuous loading of trunk parts may be done at the loading position, the device of this invention may be operated in a continuous manner. The continuous operation involves that an increased number of trunk parts may be skinned per time unit. For example, 80 trunk parts or more may be skinned per minute.

The operation of the device may be described as follows. A trunk part of which wings, legs, head and tail have been removed is placed on the conveyor 4 at the loading position 5 with its breast part 1 resting on the conveyor 4 and the front part 7 facing the inside of the device (see FIG. 1). As the conveyor 4 is rotated, the trunk part is moved towards the first guiding 11. The horizontal movement of the trunk part is converted in a vertical one as soon as the conveyor 4 enters the housing 26. In case the orientation of the trunk part might have changed, it will be reoriented by the first guiding to take the position with the narrow head part in front and the heavy back part in the back. As the conveyor is deflected in downward direction, the trunk part falls into the funnel shaped second guiding 21 which takes care of maintaining the trunk part in the right orientation with its front head downwardly oriented. Rolling over of the trunk part is counter-acted by the resistance exerted by the plate 21' of the second guiding facing the conveyor 4. Apparently a minimal resistance is sufficient to prevent trunk parts from rolling over. As the front end 7 of the trunk part has passed the second guiding 21, 21', it contacts the second conveyor 9 which ensures that the trunk part contacts the first skinner 10 in an optimum manner. The front end of the skin is grasped between the shear plate 15 and the first skinning roller 10, which is rotated in the direction of the second skinner 20. Due to the rotation thereof, the trunk part is pushed away in a direction pointing away from the first skinning roller 10. To counter-act this and improve the skinning operation, the trunk part contacts the second conveyor 9 which is rotated in the direction of the first skinner 10. As soon as part of the breast side 1 has been skinned, the back side contacts the second skinner 20 and gets skinned. The removed breast skin is collected along separation wall 17 in a container 13, the back skin is collected along separation wall 18 in a container 23, the skinned trunk parts are collected between separation walls 17 and 18.

What is claimed is:

1. A device for removing the skin from opposite sides of a bird trunk, the device comprising a conveyor for moving at least one bird trunk from a loading position towards a skinning device, the skinning device comprising a first skinner for removing the skin from a first side of the bird trunk and a second skinner for removing the skin from a second side of the bird trunk opposite the first side, the first and second skinner comprising a skinning roller for entraining the skin from the bird trunk, characterised in that the conveyor is provided for moving the trunk part from the loading position in downward direction towards the first skinner, the device comprising a first guiding with a pair of guidings positioned on opposite sides of the conveyor for positioning and guiding the trunk part in longitudinal direction with its head front end pointing towards a central passage in the device and the first skinner, the device comprising a second guiding at a position below the first guiding for guiding the trunk part towards the first skinner and restricting the movement of the trunk part in a direction pointing away from the first skinner, the first skinner being located on a first side of the central passage, the second skinner being located at a position below the first skinner on a side of the central space opposite the first skinner at a distance (d) from the first skinner which is adjusted to a distance (b) between the first and second side of the trunk part, in such a way that when at least part of the first side of the trunk part has passed the first skinner, the opposite second side of the trunk part contacts the second skinner, the first and second skinner comprising a co-operating shear plate and skinning roller with a slit therebetween for grasping a top part of the skin, the distance between the shear plate and skinning roller being adjusted to the thickness of the skin to be removed.

2. A device as claimed in claim 1, characterised in that the device comprises means for biasing the trunk part towards the first skinner.

3. A device as claimed in claim 2, characterised in that the biasing means comprise an endless conveyor belt, which is revolved in the direction of the first skinner.

4. A device as claimed in claim 1, characterised in that at a position below the first skinner means are provided for receiving the back skin and conveying the back skin to a first container.

5. A device as claimed in claim 1, characterised in that at a position below the second skinner means are provided for receiving the breast skin and conveying the breast skin to a second container.

6. A device as claimed in claim 1, characterised in that the central passage gives access to means for receiving skinned trunks after they have been skinned by the first and second skinner.

7. A device as claimed in claim 1, characterised in that the first guiding comprises a first and second plate, hingedly mounted with respect to the longitudinal direction of the conveyor, on opposite sides of the conveyor, in such a way that they form a passage for the trunk parts which narrows in the direction of the central passage.

8. A device as claimed in claim 1, characterised in that the device comprises a second guiding with a first and a second plate positioned at a level below the first guiding for receiving trunk parts from the first guiding and controlling the direction in which the trunk parts are guided to the first skinner.

9. A device as claimed in claim 8, characterised in that the second guiding comprises a third plate to prevent rolling over the trunk part.

10. A device as claimed in claim 8, characterised in that the second guiding converges towards the first skinner, each plate of the second guiding being hingedly mounted to a housing of the device.

* * * * *